RESONANT CHARGING OF ROTARY ENGINES
Filed Dec. 13, 1965 4 Sheets-Sheet 1
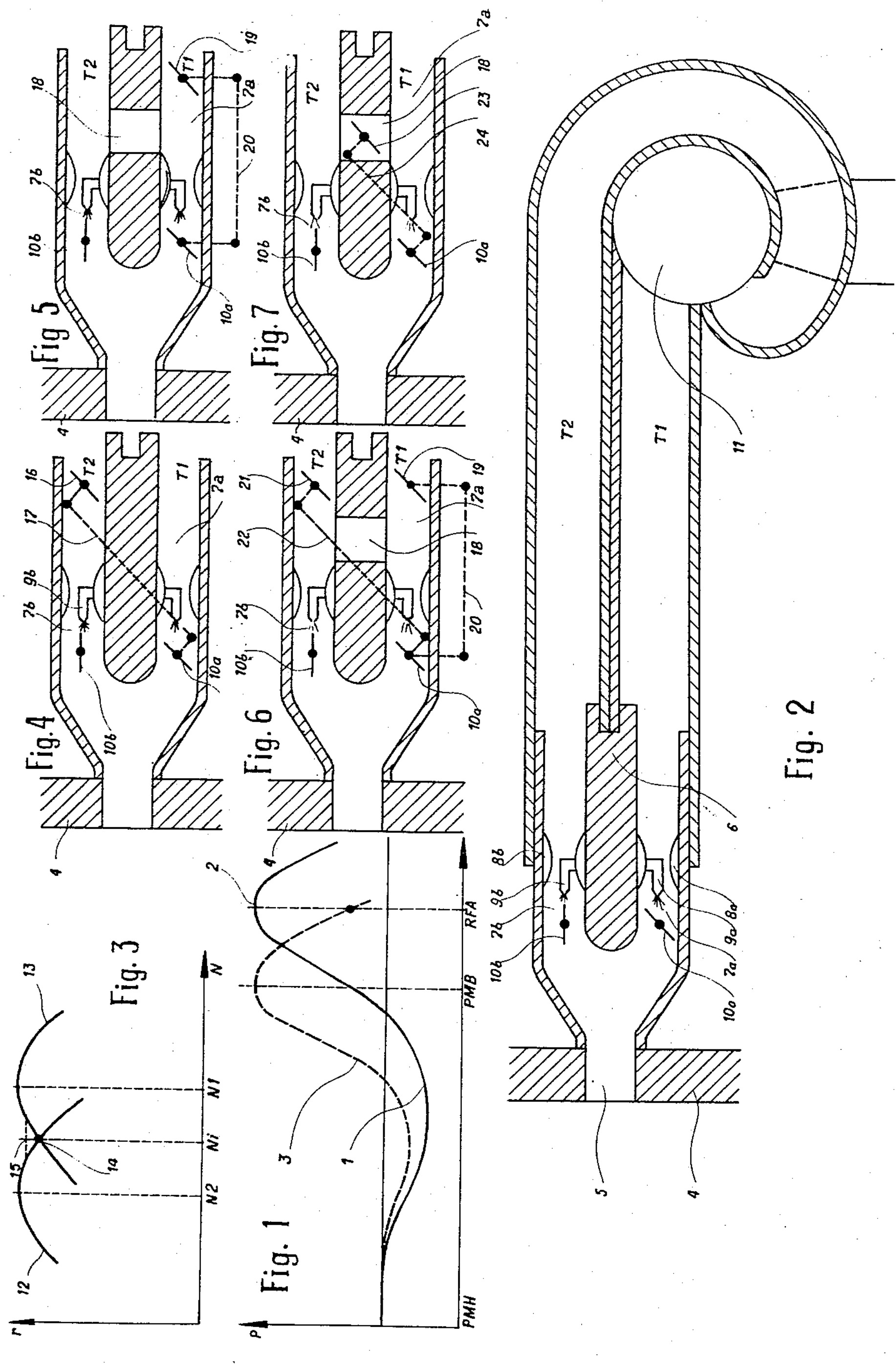

RESONANT CHARGING OF ROTARY ENGINES
Filed Dec. 13, 1965
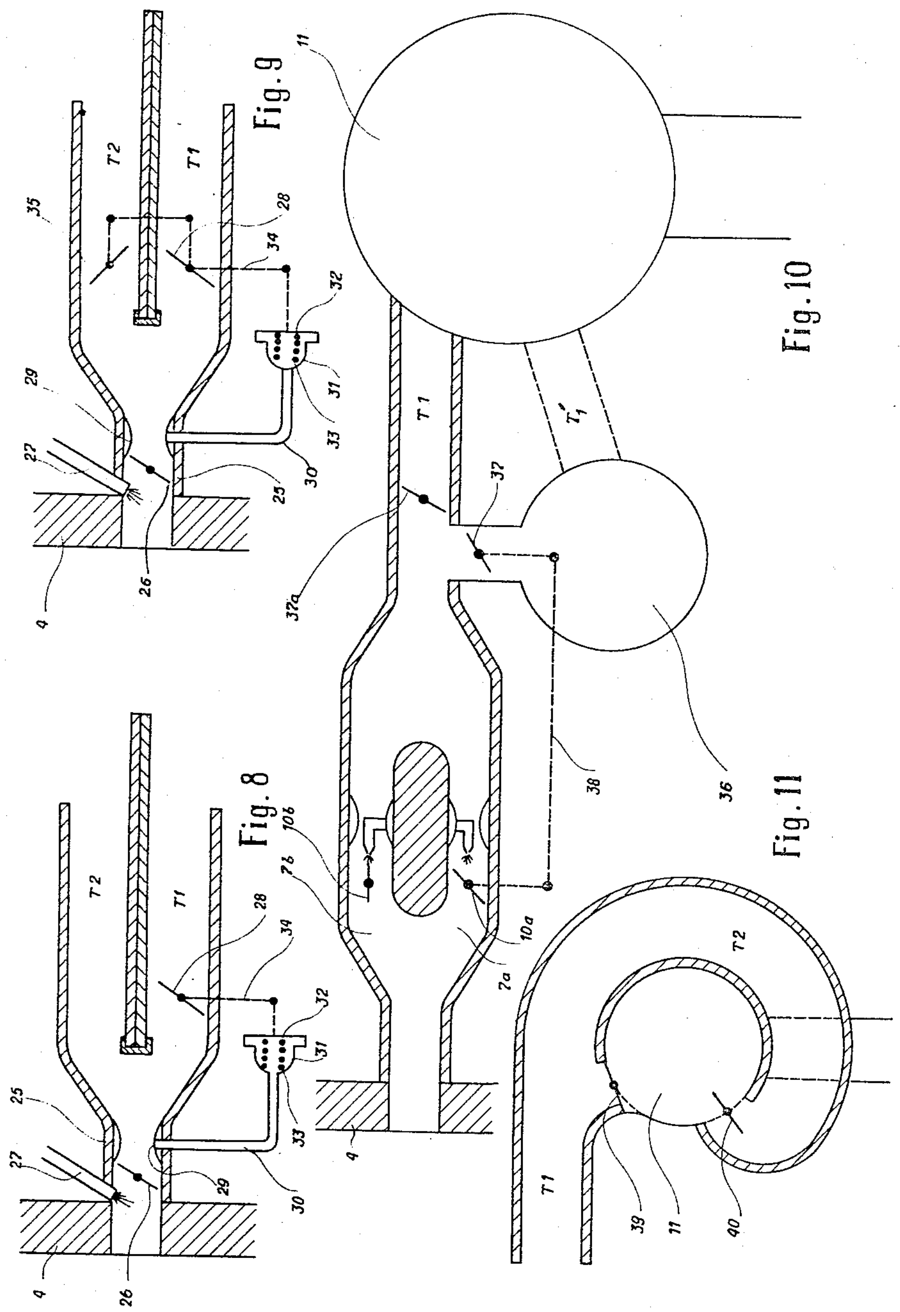

$T_2$
$T_1$
11
28
26
8
9
6
52
53
51
50
54
46
42
55
48
56
44
57

United States Patent Office 3,370,575

Patented Feb. 27, 1968

1

3,370,575

RESONANT CHARGING OF ROTARY ENGINES

Jean-Pierre Soubis, La Celle-Saint-Cloud, Seine-et-Oise, France, assignor, by mesne assignments, to Societe de Construction et d'Exploitation de Materiels et Moteurs (S.C.E.M.M.), Paris, France Filed Dec. 13, 1965, Ser. No. 513,302

1 Claim. (Cl. 123—8)

ABSTRACT OF THE DISCLOSURE

A rotary piston engine is provided with resonant charging by the use of two intake ports in the stator of the engine. A separate intake duct is connected to each intake port. The intake ports and ducts are constructed such that the closure of the ports by rotation of the piston occurs at the instant when the resonance effect in one of the ducts provides maximum filling for a first speed and in the other duct provides maximum filling for a second speed.

This invention relates to improvements in the feed of internal combustion engines.

These engines can be fed by carburetor having one or more carburetting elements or by injection either direct or indirect or may be engines firing by compression of diesel type. In a motor having a carburetor, the carburetor is generally located close to the intake orifice and is connected to the air filter by a single duct having a predetermined length and cross-section. It is known that the column of air in this duct undergoes vibratory phenomena due to the aspiration of the intake and that, for a predetermined speed of the motor, the maximum pressure obtained at the end of admission at the intake orifice and thus in the intake manifold coincides with the termination of admission and produces an optimum filling which is known as "resonance."

This resonance is a function in part of the dimension, length and cross-section, of the admission duct and in part of the speed of the engine. It is produced only at a single speed and for greater and lesser speeds than the single speed the filling and consequently the power of the engine is much reduced.

This is equally true for injection motors or diesel type engines where the induction duct for air then directly connects the air filter and the intake orifice.

The present invention has for an object to provide a good filling for several engine speeds by obtaining resonances at the different speeds.

To this end, the present invention relates to a process for feeding an internal combustion engine to maintain a high level of filling for the engine over a predetermined range of speed.

This process includes varying the structure of the feed system when the speed of the engine varies in such a way that for at least two speeds in the range considered, the closing of the intake orifice coincides with a pressure at the level of the intake orifice of the gases in vibrating state in the feed circuit.

A first embodiment for the process of the present invention is characterized by the feed circuit opening into the intake orifice of the engine including at least two ducts which are different from each other in length and/or in cross-section.

Each duct is such that taken separately it permits optimum filling of the engine for a predetermined speed within the aforesaid range of speeds by a resonance effect of the gases in vibrating state passing through the duct, this embodiment including means for progressively obstructing and varying the cross-section of the passage in each of the aforesaid ducts in association with means for controlling the aforesaid obstructing means as a function of the speed of the engine.

2

A second and more perfected embodiment of apparatus for carrying out the process of the present invention is used with rotary piston engines and the feed circuit includes at least two ducts opening respectively into separate intake ports in the stator wall of the engine which are closed successively by rotation of the piston with the duct opening into the first intake port, when used alone, providing optimum filling for the engine for a first speed in the predetermined range by a resonance effect of the gases in vibrating state passing through the duct, the opening of the other duct providing optimum filling for the engine for a second speed greater than the first speed. The respective locations of the aforesaid intake ports in the stator wall of the engine being selected in such a way that the closing of admission by obturation of the first port by passage of the piston occurs at the instant when the resonance effect in the corresponding duct assures maximum filling for a first speed and the closing of admission by obturation of the second port by passage of the piston produces a maximum filling for a second higher speed than the first speed. This apparatus includes obturation means for varying the cross-section of the passage in at least one of the ducts in association with means for control of the obturation means as a function of the speed of the engine.

Means for varying the cross-section of the passage may include butterfly valves and means for controlling them as a function of the engine speed including a venturi situated upstream of the butterfly valves, manometric apparatus including a membrane controlled by a spring and actuated by the depression produced in the venturi and control rods for the butterfly valves connected to the membrane.

The means for controlling the butterfly valves as a function of engine speed may also include manometric apparatus connected to a membrane controlled by a spring with pressure acting on the membrane from the oil pump of the engine.

In a first embodiment of feed apparatus in accordance with the present invention, the engine includes a carburetor having two carburetting elements and two jets, a throttle butterfly valve downstream of each jet in each of the elements of the carburetor, one of the butterfly valves being controlled automatically as a function of engine speed in such a way as to close when the speed is reduced and the air filter is connected to the two elements of the carburetor by two ducts mounted in parallel with these ducts having different length and/or cross-section characteristics.

In a first alternative of the first embodiment described above, a supplementary butterfly valve is arranged upstream of one of the two jets and is connected to the automatic butterfly valve by suitable linkage.

A second variation of the first embodiment of the present invention has an opening between the two ducts which opening is located upstream of the jets.

In the structure of this second variant, a supplementary butterfly valve may be disposed in the opening between the ducts and is operated with the automatic butterfly valve by suitable connecting linkage.

In a modification of the first embodiment of the present invention for carrying out the process of the invention, and to adapt it to injection engines or to single element carburetors, the two parallel ducts are connected upstream of the intake port by a single tube containing a first butterfly valve whose opening is controlled as a direct function of the load, one at least of the two ducts including upstream of the tube a supplementary butterfly valve with its opening controlled by automatic means as a function of engine speed.

In a second embodiment of the present invention for carrying out the process thereof, carburetion means are provided including a first air admission duct connected to the carburetion means, a chamber communicating with the first air admission duct through a second duct upstream of the carburetion means, a butterfly valve disposed in the second duct and control means for the butterfly valve controlling the same as a function of the speed of the engine.

In a variant of the second embodiment of this invention, a third air admission duct is connected to the chamber, a supplementary butterfly valve is disposed in the first air admission duct upstream of the chamber and control means for this supplementary butterfly valve are provided to control the same as a function of the speed of the engine.

In a third embodiment of the present invention, the feed apparatus includes two ducts which are different in length and or cross-section characteristics connected in series with one of the ducts ending in a first air admission orifice in which a first butterfly valve is disposed with the other duct terminating in a second air admission orifice in which a second butterfly valve is disposed, the butterfly valves being controlled by suitable means as a function of the engine speed so that at high or medium speeds the first butterfly valve will be open and the first butterfly valve will close at lower speeds with the second butterfly valve then being open.

The process of the present invention essentially improves the power at different speeds by creating conditions of dynamic supercharging for at least two speeds by modifying the length and/or the cross-section of the admission ducts as a function of engine speed.

This result can be obtained without regard to the type of internal combustion engine and is useful with conventional engines having reciprocating pistons controlled by admission and exhaust valves.

The present invention is also useful with rotary motors. Here advantage is obtained by feed through ports in lieu of a valve system and because, for equal power, a single motor element can be used in the place of a plurality of cylinders of the conventional engine.

For these reasons and because of the greater simplicity of application, the improvements of the present invention hereinafter described will be directed principally to use with rotary engines, it being understood that these developments are equally applicable for use with engines of the conventional type.

The description of the present invention which follows refers to the accompanying drawings which show illustrative embodiments thereof. These embodiments are in no way a limitation of the invention and explain the utility thereof. The several embodiments of the invention shown in the drawings and described in the specification form a part of the invention.

In the accompanying drawings, FIG. 1 graphically represents curves showing the variations of the pressure of air or of the air-fuel mixture in the intake port of a rotary engine;

FIG. 2 is a schematic view of a first embodiment of apparatus of the present invention;

FIG. 3 illustrates the charge obtained by the apparatus of the present invention for different engine speeds;

FIGS. 4, 5, 6 and 7 are schematic sectional views of variations of the first embodiment of the present invention;

FIGS. 8 and 9 show apparatus schematically for engine feed by injection;

FIG. 10 is a schematic view of a second embodiment of apparatus in accordance with the present invention;

FIG. 11 is a partial schematic view of a third embodiment of the present invention;

Figure 12:
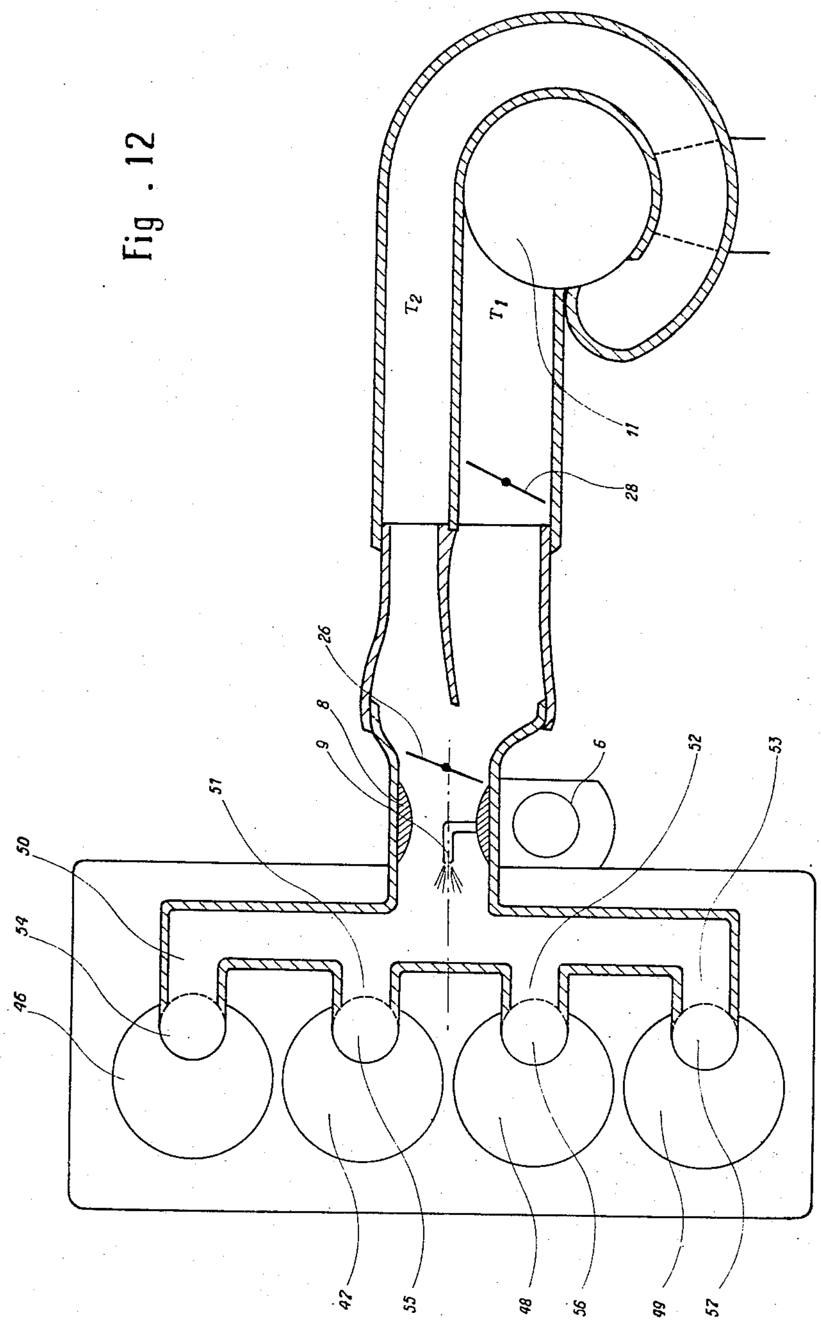
FIG. 12 illustrates the application of the present invention to a conventional four cylinder internal combustion engine.

In the following description of the several embodiments of the present concept and variations thereof, terminology analogous to that used with engines employing reciprocating pistons will be used including the expression upper dead center (PMH) to designate the position of the rotary piston corresponding to a minimum volume of a combustion chamber and the expression lower dead center (PMB) will be used to designate the position of the piston corresponding to a maximum value for this volume.

Curve I in solid line of FIG. 1 shows the variations of the pressure of the air or carbureted mixture at the intake port of a rotary motor as a function of the position of the piston. This pressure obtains a maximum 2 and, to obtain an optimum filling for the motor and thus the maximum power, closing of the admission port should coincide with this maximum 2. This is only obtained, for a given structure of the feed circuit, at a predetermined motor speed which is resonance. When the speed reduces or increases the curve 1 is changed to another curve (curve 3 for example) in which the maximum is shown adjacent the point of lower dead center (PMB) and, at the closing of the admission port (RFA), the pressure is noticeably lower which corresponds to an insufficient filling of the engine.

In accordance with the present invention the structure of the feed circuit is modified as a function of the engine speed so that resonance can be obtained for at least two engine speeds.

FIG. 2 illustrates a first embodiment of the present invention for feeding a rotary piston engine in which 4 designates a part of the wall of the block surrounding the admission port 5. A carburetor 6 has two elements including, in known fashion, a first element **7*b* containing a venturi 8*b*, a jet 9*b*, and a throttle valve 10*b*, which is positively controlled as by the action of the accelerator pedal if the engine is in an automobile. The second element 7*a* includes likewise, a venturi 8*a*, a jet 9*a* and a butterfly valve 10*a* but butterfly valve 10*a* is automatically controlled, in known manner, by means of the average of the respective depressions in venturi 8*a* and venturi 8*b*** so that it will remain closed at low engine speeds.

Each of the elements **7*a* and 7*b* is connected by a duct $T_1$ and $T_2$, respectively, to an air filter 11**. Duct $T_2$ has a greater length than duct $T_1$ and/or a smaller cross-section. Duct $T_2$ is easily mounted by turning the same around the air filter but other arrangements are equally possible.

If the engine is fed solely by the short duct $T_1$ resonance will be obtained for a speed $N_1$ which can be on the order of 2500 r.p.m. for an engine in an automobile and the filling and the power developed will then be maximum.

If, on the other hand, engine feed is solely through long duct $T_2$, resonance is obtained for a speed $N_2$ which is less than $N_1$ and could be about 1750 r.p.m. depending on the dimensions of $T_1$.

If the engine is fed by the two ducts $T_1$ and $T_2$ in parallel, resonance is obtained for a speed $N_3$ greater than $N_1$, the two parallel ducts being equivalent to a duct which is shorter than the shorter of the two ducts. $N_3$ is generally rather close to $N_1$.

FIG. 3 shows the feed curve obtained in part with duct $T_2$ alone, curve 12, and in part with duct $T_1$ alone, curve 13, these curves having a maximum or resonance for speeds $N_2$ and $N_1$ respectively. The curve corresponding to two ducts $T_1$ and $T_2$ in parallel is practically coincident with curve 13. Curves 12 and 13 intersect at 14.

This embodiment functions as follows. Adjacent speed $N_1$ the two butterfly valves **10*a* and 10*b* are open and feed occurs through the two ducts $T_1$ and $T_2$, curve 13. Leaving $N_1$, as when the motor speed decreases, butterfly valve 10***a* progressively closes in such a way as preferably to be completely closed at point 14 corresponding to speed $N_i$, intermediate between $N_1$ and $N_2$. If the speed continues to decrease, duct $T_2$ contributes solely to the feed and the feed curve is curve 12. Thus, for speed $N_2$ a new resonance is obtained with optimum filling and optimum power.

It should be understood that the values $N_1$ and $N_2$ and consequently the dimensions of the duct $T_1$ and $T_2$ are chosen as a function of the desired result. For an engine for an automobile the values 1750 and 2500 r.p.m. are important because they correspond to a normal range of engine speeds. For a racing vehicle the value selected for $N_1$ would be much higher, 5,000 to 6,000 r.p.m. for example since these motors must generate maximum power at high speeds.

The laws for opening and closing of butterfly valve 10*a* are multiple and it can be particularly advantageous to not close this valve completely from the speed $N_1$ in such a way to obtain in the neighborhood of speed $N_1$ the charge curve 15 shown in broken lines in FIG. 3.

It is thus seen that in accordance with the invention, feed of the engine is effected under most advantageous conditions for two speeds $N_1$ and $N_2$ and that these conditions are only slightly diminished for the range of speeds between $N_2$ and $N_1$ and adjacent of $N_1$ and $N_2$.

Variations of the embodiment described above are schematically shown in FIGS. 4, 5, 6, 7, 8 and 9 and the same reference numerals will be utilized to designate the same elements in these figures.

In FIG. 4, a supplementary butterfly valve 16 is mounted upstream of jet 9*b* in the element 7*b* or in duct $T_2$. The movement of butterfly valve 16 is controlled by butterfly valve 10*a* with the two valves being connected by suitable linkage indicated at 17 with this connection being such that, when valve 10*a* is wide open, valve 16 is closed thus blocking duct $T_2$. Admission then occurs through duct $T_1$ alone for a speed greater or equal to $N_1$. When the speed decreases, the progressive closing of valve 10*a* causes the opening of valve 16 through linkage 17 so than at speed $N_2$ duct $T_1$ is closed and feed occurs solely through duct $T_2$.

As above and in the examples which follow, the laws of opening and closing of the butterfly valves can be modified having due regard for the essential fact that at speed $N_1$, $T_1$ must be open and duct $T_2$ should be open or closed or in an intermediate state and for speed $N_2$ duct $T_2$ in open and duct $T_1$ closed or, at the most, slightly open.

In FIG. 5, a port 18 is provided between the elements 7*a* and 7*b* of the carburetor upstream of the jets and a butterfly valve 19 is disposed upstream of this opening in element 7*a* or in duct $T_1$. The movements of butterfly valve 19 are synchronized with those of butterfly valve 10*a* through linkage 20 so that closing of valve 10*a* closes valve 19.

The operation is the same but the valve can be regulated so that at speed $N_2$ and adjacent thereto, butterfly valve 10*a* will not be completely closed while butterfly valve 19 is more closed than valve 10*a*, the air from duct $T_2$ then passing in part through port 18 into the element 7*a*.

In FIG. 6 a second supplementary butterfly valve 21 is added which is connected to butterfly valve 10*a* by linkage 22 in such a way as to open when butterfly valve 10*a* closes. In a variation of the structure shown in FIGS. 5 and 6, ducts $T_1$ and $T_2$ can be connected upstream of the carburetor and the butterfly valves 19 and 21 are then mounted in their downstream extremities.

At speed $N_1$ or adjacent thereto and above $N_1$, butterfly valve 19 is open but valve 21 is closed at least in part so that duct $T_1$ alone supplies air or supplies more air than $T_2$. Because of opening 18, duct $T_1$ feeds both elements 7*a* and 7*b*. If the speed decreases, butterfly valve 10*a* closes causing progressive closing of butterfly valve

19 and progressive opening of butterfly valve 21 so that, at $N_2$ or adjacent thereto and below $N_2$, duct $T_2$ alone or almost alone provides the air feed.

In FIG. 7, only a single supplementary butterfly valve 23 is used located in port 18 and connected by linkage 24 to butterfly valve 10*a*.

At speed $N_1$ or adjacent thereto and at higher speeds, valve 23 is closed or almost closed and the two valves 10*a* and 10*b* are open. At speeds less than $N_1$ closure of valve 10*a* results in a total or partial closure of valve 23 so that duct $T_1$ is closed or at least partially closed by the joint action of valves 10*a* and 23.

In a variation of the structure of FIG. 7, which is not shown, a second supplementary butterfly valve can be disposed in duct $T_1$ upstream of port 18 connected to butterfly valve 10*a* and in another variation, which also is not shown, a third butterfly valve can be mounted in duct $T_2$ upstream of port 18 and this third butterfly valve can be synchronized with butterfly valve 10*a*.

FIGS. 8 and 9 show embodiments of the present invention for use in indirect and direct injection engines or in an engine having a single element carburetor.

In FIG. 8, the two ducts $T_1$ and $T_2$ are connected at their lower extremities to a single duct 25 which, in the case of a single element carburetor, is the single element of the carburetor. The throttle valve 26 subject to positive control is mounted in duct 25 upstream of injector 7. A supplementary butterfly valve 28 is mounted at the downstream extremity of duct $T_1$. To obtain automatic control of butterfly valve 28, a venturi 29 is disposed in duct 25 and a tube 30 leads the pressure in this venturi to manometric structure 31 including a membrane 32 controlled by spring 33 and connected to linkage 34 controlling butterfly valve 28.

To avoid the use of venturi 29, control of this butterfly valve can be provided by any other parameter which varies as a function of engine speed as for example the pressure from the oil pump, the water pump or the like.

The function is similar to that described above. At speed $N_1$ and adjacent thereto and at higher speeds, valve 28 is open and the two ducts $T_1$ and $T_2$ function in parallel. When the speed decreases, valve 28 closes and at speed $N_2$ it is completely or almost completely closed so that duct $T_2$ provides practically all of the feed of air to the engine.

In the variation shown in FIG. 9, a second supplementary butterfly valve 35 is mounted at the lower extremity of duct $T_2$ and is directly controlled by apparatus 31 or by butterfly valve 28, as shown in the figure, the one opening when the other closes.

In the case of a diesel engine, the structure is the same as shown in FIGS. 8 and 9 but butterfly valve 26 is not used, the admission of air being constant in this type of motor when the charge varies.

FIG. 10 shows a second embodiment of the present invention. A double element carburetor similar to that of FIG. 2 is employed. A single duct $T_1$ is utilized to feed air. A chamber 36 is mounted in parallel on duct $T_1$ adjacent the carburetor and a butterfly valve 37 is mounted at the entrance of this chamber, the movements of this butterfly valve being synchronized with those of valve 10*a* through linkage shown schematically at 38.

When valve 37 is open, a feed system is obtained providing resonance at two speeds $N_2$ and $N_3$, the speed $N_2$ being less than $N_1$ and the other $N_3$ being greater than $N_1$, the speed $N_3$ being lower when volume 36 is larger. Linkage 38 permits opening of valve 37 only for lower speeds, valve 10*a* being then closed, but valve 37 can be controlled in such a way that it is open for speed $N_2$ and for lesser and neighboring speeds as well as for speeds greater than $N_1$.

In place of being mounted upstream of the carburetor, chamber 36 can be mounted downstream thereof.

In accordance with the variation shown in broken line in FIG. 10, chamber 36 is connected directly by a duct $T_1$ to the air filter 11 and is then mounted in series. This structure can then include either a supplementary butterfly valve mounted preferably at 37*a* in duct $T_1$ or two supplementary butterfly valves 37 and 37*a*, valve 37*a* being connected to valve 10*a*, At speed $N_1$, valves 37 and 37*a* are simultaneously open or only valve 37*a* is open. When the speed reduces valve 37*a* closes and valve 37 opens or remains open.

The embodiment described above and shown in FIG. 10 can be used to feed an injection motor, a diesel motor or a single element carburetor and the control of the supplementary butterfly valve or supplementary butterfly valves takes place in the manner described above.

It should be noted that in place of the chamber connected in parallel or in series, several chambers can be used in parallel and/or in series connected to one or the other of the two ducts.

FIG. 11 shows a third embodiment of the present invention where the two ducts $T_1$ and $T_2$ are arranged in series with the duct $T_1$ opening into air filter 11 through an orifice in which a butterfly valve 39 is mounted and duct $T_2$ opens into the air filter through an orifice in which a butterfly valve 40 is mounted with duct $T_2$ connected to the upstream end of duct $T_1$. The two ducts may or may not have different dimensions. If valve 40 is open or closed, valve 39 is open and the influence of duct $T_1$ is predominant and resonance is obtained for high speed $N_1$. If valve 39 is closed, valve 40 is open and only duct $T_1$ opens into the air filter to provide resonance at speed $N_2$. All intermediate positions are obtainable.

Control of valves 39 and 40 is obtained as required and they may be connected to butterfly valve 10*a* or controlled by utilizing other parameters which are functions of the engine speed.

It should be understood that control of the several supplementary butterfly valves used in the several embodiments described above can be provided in different manner than described and, in particular, in lieu of connection to butterfly valve 10*a*, control can be obtained by utilizing one of the functional parameters of speed as has been more particularly described in connection with the structure of FIG. 8.

The invention is equally useful in the case of several engines connected in series. Each engine can have a separate and feed system identical to those described or a single feed system discharging into a manifold connecting the intake ports of the different engines.

FIG. 12 relates more particularly to the feed of a four cylinder engine of classic type having reciprocating pistons as seen from above in partial section.

The reference numerals in this figure indicate like parts found in the other figures.

Carburetor 6 in FIG. 12 is a single element carburetor having a single jet 9.

Feed to the four cylinders 46, 47, 48 and 49 is accomplished through passages 50, 51, 52 and 53, respectively, discharging into intake orifices 54, 55, 56 and 57, respectively.

In a manner similar to that of the embodiment of FIG. 8, throttle valve 26 is mounted in the body of the carburetor upstream of jet 9.

A supplementary butterfly valve 28 is mounted in the downstream extremity of duct $T_1$ and this butterfly valve is automatically controlled utilizing, for example, a control system analogous to that seen in FIG. 8.

When a rotary piston engine is to be fed, it is convenient to make use of further supplemental embodiments adapted to carry out the process by causing the two ducts $T_1$ and $T_2$ to discharge through separate openings into the block of the motor. The respective locations of these openings are such that the respective instants of their closing by the rotor during its rotation correspond to the respective optimum delay in the closing of admission for the speeds $N_1$ and $N_2$ respectively.

The delay in closing of admission for the two speeds $N_1$ and $N_2$ obtained in this way improves the filling of the motor for each of these two speeds and more generally within the overall range of speeds proximate to $N_1$ and $N_2$.

This new embodiment is particularly applicable in combination with the embodiments of the invention previously described and will be described with reference to FIG. 13 which illustrates the application of this improvement to the first embodiment of the invention as seen in FIG. 2.

Figures 13, 14:
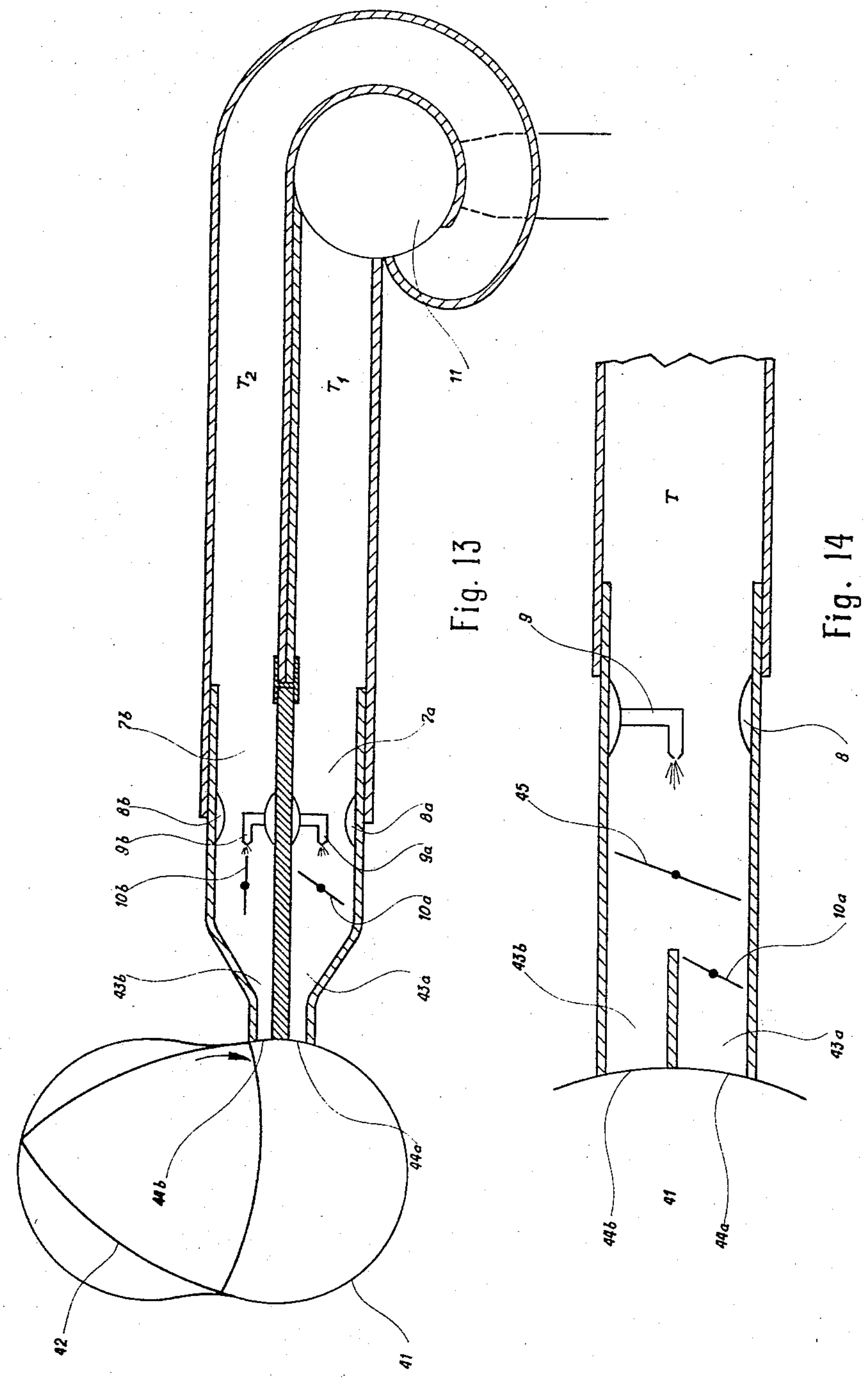
FIGS. 13 and 14 illustrate a further embodiment of the present invention specially applicable to rotary piston engines.

The embodiment of FIG. 13 differs from that of FIG. 2 in that the elements 7*a* and 7*b* of the carburetor are connected by separate admission conduits 43*a* and 43*b* discharging in the block 41 through separate admission ports 44*a* and 44*b* which are successively closed by the rotation of piston 42, port 44*b* being completely obstructed before port 44*a* commences to close.

This improvement functions as follows. At high speeds, equal or greater than $N_1$, butterfly valve 10*a* is open and butterfly valve 10*b* can also be open because duct $T_2$ has no influence or very little influence on the action of duct $T_1$. The filling is therefore optimum for the speed $N_1$ and the delay in closing of admission (RFA) is also maximum since this closing can only take place when piston 42 has passed intake 44*a*. This high value of RFA is favorable for obtaining a complete filling at high speeds.

If the speed decreases, valve 10*a* commences to close in such a way as to be completely closed when the speed reaches $N_2$ at which time only duct $T_2$ should be used. Valve 10*a* being closed, the delay of closing of admission is shorter since the admission is terminated as soon as piston 42*a* passes intake 44*b*. This lower value of RFA is favorable to obtaining a complete filling at low speeds.

With this construction, the filling is achieved under the best conditions for the two speeds $N_1$ and $N_2$ and under nearly as good conditions for the speeds between and adjacent to $N_1$ and $N_2$.

It should be understood that in place of the butterfly valves, any other convenient closure mechanism can be used. Further, ducts $T_1$ and $T_2$ can be replaced by an admission structure such that at high speeds element 7*a* at least is open, such a structure providing a good filling and at a lower speed, element 7*a* is closed, the device thus providing good filling and high power. Such admission structures have been described above.

In a single element carburetor (FIG. 14) the admission duct downstream of jet 9 is divided in two conduits 43*a* and 43*b* discharging through intakes 44*a* and 44*b* of the block. A throttle valve 45 is arranged in the principal conduit T and an automatic butterfly valve 10*a* is disposed in conduit 43*a*. The operation is analogous to that described above, the delay in the closing of admission (RFA) decreasing in function of the speed, since valve 10*a* closes and obstructs duct 43*a*. Feed of air to the carburetor occurs either by the single duct T, as seen in FIG. 14, or by two ducts $T_1$ and $T_2$ as above in FIG. 13, the two ducts joining upstream of jet 9 with an automatic butterfly valve being disposed in duct $T_1$ to close it at low speeds.

In the case of an injection motor, the arrangement is similar to that of FIG. 13 with an injector mounted downstream of butterfly valves 10*a* and 10*b* replacing the venturi-jet structure. The function is the same as that described with regard to FIG. 13, valve 10*b* being positively controlled i.e. in direct function of the desired charge and valve 10*a* closing automatically as the speed decreases.

In the case of a diesel motor, the arrangement is the same as for an injection motor, but as there is no need for a throttle valve, valve 10*b* is eliminated and valve 10*a* remains and is automatically controlled as a function of speed.

It should be noted in these various embodiments that a single air intake conduit can be used between the air filter and the carburetor or the intake ports where the charge then is divided in two, the filling of the engine being already greatly improved as a result of the variations in the delay in closing admission achieved by obstructing, according to the speed, one or the other of the admission ports.

The number of admission ducts and the number of admission ports is not necessarily limited to two. In FIG. 13 ports **44*a* and 44*b*** are shown as adjacent but it is evident that they need not be so and they could be located in any desired position in the block.

The present invention is not limited to the specific embodiments described above and shown in the drawings and various changes or modifications therein may now be suggested without departing from the scope of the present inventive concept.

Particularly, optimum filling can be obtained relatively simply for more than two distinct speeds.

For example, an embodiment providing optimum filling for four speeds could be realized by combining two ducts of the type $T_2$ (FIG. 2) laterally disposed with respect to each other with means for varying the operative length of each of these ducts of the type illustrated in FIG. 11.

What I claim is:

1. Apparatus for feeding a rotary piston engine for maintaining a high level of filling of the engine in a predetermined range of speeds comprising duct means including at least two ducts, at least two separate intake ports in the stator wall of the engine, each of said ducts opening into one of said intake ports, said intake ports being successively closed by the rotation of the piston, said duct opening into that intake port first reached by the rotation of the piston being so arranged as to provide an optimum filling of the motor for a first speed in said predetermined range of speed by a resonance effect of the gases in vibrating state in said duct, opening of another one of said ducts providing an optimum filling of the engine for a second higher speed in said range of speeds, the respective locations of said intake ports in the stator wall of the engine being such that the closure of admission of the first of said intake ports by the rotation of the piston occurs at the instant when the resonance effect in the corresponding one of said ducts provides a maximum filling for the first speed and the closure of admission of the second of said intake ports by the rotation of the piston occurs at the instant when the resonance effect in the corresponding one of said ducts provides a maximum filling for the second higher speed, adjustable means for varying the useful section of passage in at least one of said ducts as a function of the speed of the engine.

References Cited

UNITED STATES PATENTS

| | | | |
|---|---|---|---|
| 1,434,446 | 11/1922 | McQueen | 123—8 |
| 1,791,490 | 2/1931 | Dilworth | 123—52 |
| 3,103,208 | 9/1963 | Price et al. | 123—8 |
| 3,171,395 | 3/1965 | Bartholomew | 123—52 |
| 3,265,046 | 8/1966 | Paschke | 123—8 |

FOREIGN PATENTS 769,041 2/1957 Great Britain.

OTHER REFERENCES

Automobile Engineer, December 1958, "Manifold Tuning," article pp. 519, 520, 522, and 523.

WENDELL E. BURNS, *Primary Examiner.*